United States Patent [19]
Gillen et al.

[11] 4,106,145
[45] Aug. 15, 1978

[54] BOAT MOUNTED GAME BLIND

[76] Inventors: John E. Gillen; Gary C. Odom, both of P.O. Box 756, Tioga, La. 71477

[21] Appl. No.: 819,012

[22] Filed: Jul. 25, 1977

[51] Int. Cl.² .............................................. B63B 35/00
[52] U.S. Cl. ................................................ 9/5; 135/6
[58] Field of Search ....................... 9/1.1, 1.2, 1.5, 1.7, 9/2 R, 2 C, 2 F, 5; 296/110; 135/5 R, 6, 4 R; 280/31, 47.38, 289 S, 657, 658

[56] References Cited

U.S. PATENT DOCUMENTS

| 583,033 | 5/1897 | Danz ............................................ 9/5 |
| 2,153,547 | 4/1939 | Charlop et al. ........................ 135/5.1 |
| 2,513,764 | 7/1950 | Vonder Ahe ........................ 296/110 |
| 2,689,579 | 9/1954 | Sartori ..................................... 135/6 |

FOREIGN PATENT DOCUMENTS

| 683,415 | 2/1965 | Italy ............................................. 9/1.7 |
| 261,020 | 4/1949 | Switzerland ............................. 296/110 |

Primary Examiner—Trygve M. Blix
Assistant Examiner—Jesus D. Sotelo
Attorney, Agent, or Firm—Robert K. Rhea

[57] ABSTRACT

A shroud supporting frame structure extends transversely of an open boat and is connected with its gunwales to form a weatherproof collapsible concealing cover for a hunter. The frame structure includes a plurality of bow elements swingably mounted for movement in a fore and aft direction about respective horizontal axes. Frame stop pins and a counterbalancing action of the bow elements supports the blind in a first relative disposition presenting a concealment cover and permits movement of at least one of the bow elements to a second partially collapsed relative disposition to present an opening therein affording an unobstructed field of view.

1 Claim, 8 Drawing Figures

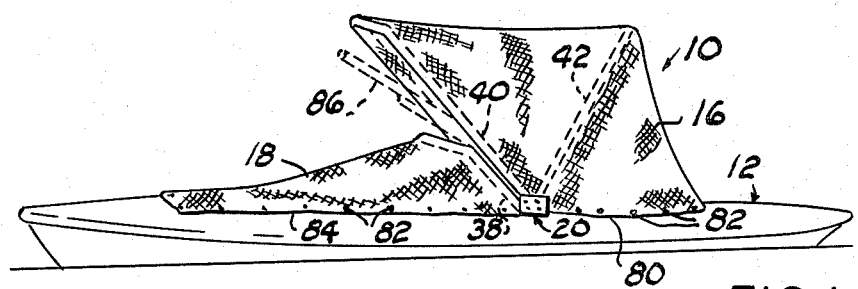
FIG. 1
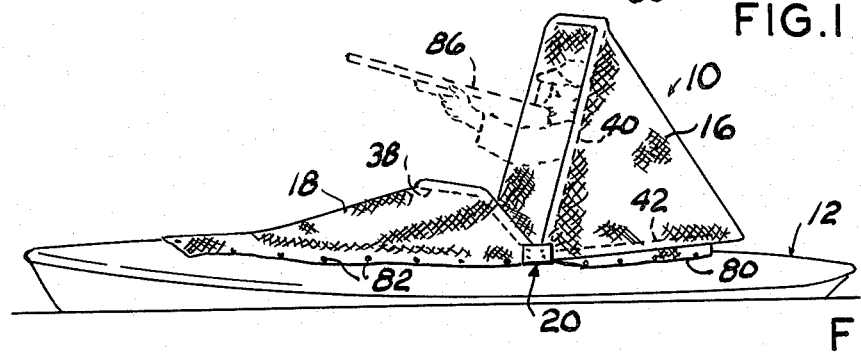
FIG. 2
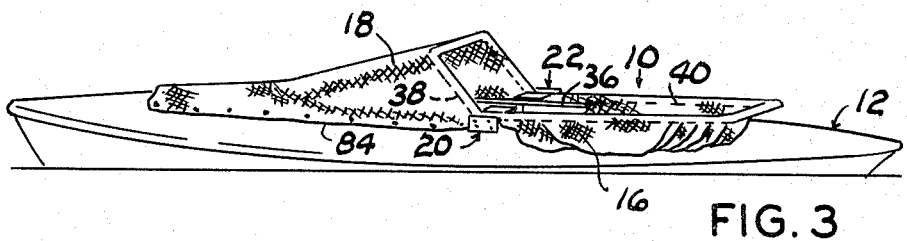
FIG. 3
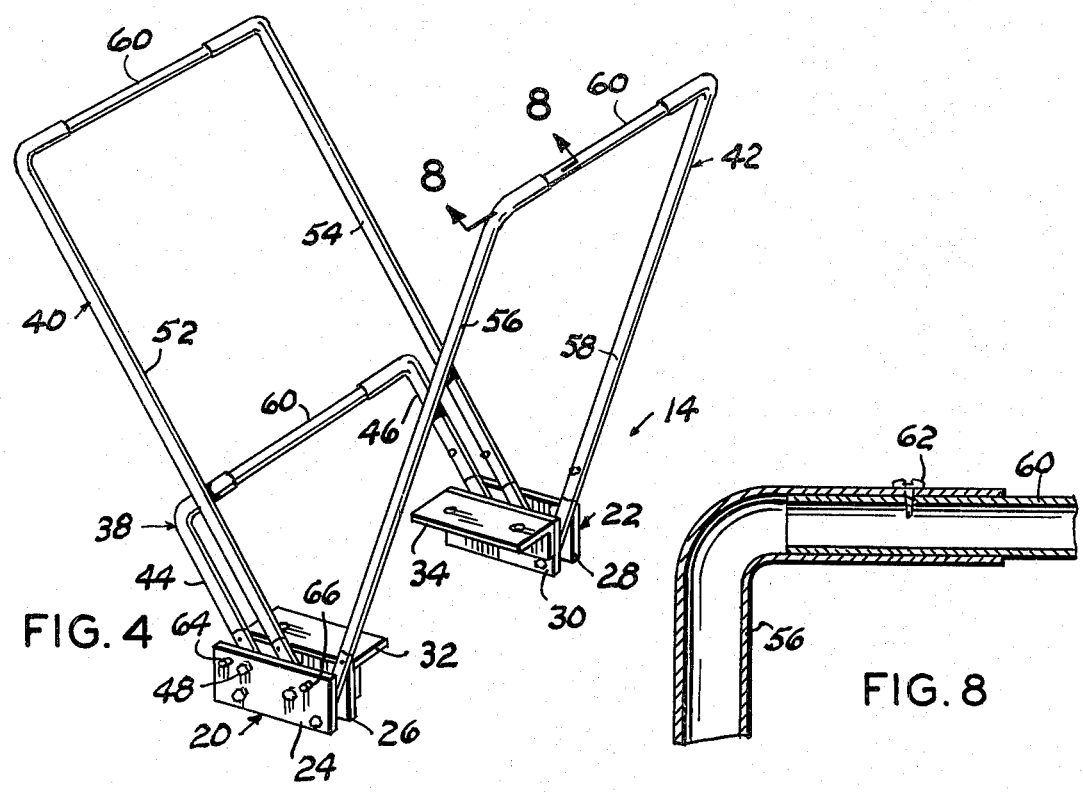
FIG. 4
FIG. 8

BOAT MOUNTED GAME BLIND

BACKGROUND OF THE INVENTION

Field of the Invention

The present invention relates to hunting blinds and more particularly to a small boat supported game blind.

Portable or floating hunting blinds have generally comprised a combination boat structure and hunter's concealment area as disclosed by U.S. Pat. Nos. 2,816,297 and 3,787,912. However, these blinds are not capable of being easily dismantled or removed from the boat for using the boat for other purposes. A wader's float type blind is disclosed by U.S. Pat. No. 3,936,969. Collapsible and sun shade and weather protective canopy structures for boats are disclosed by U.S. Pat. Nos. 2,513,764 and 2,689,579.

The principal distinction of this invention over the above named patents is its feature of providing a collapsible frame structure for small open boats which is easily attached or removed and in which the frame structure is arranged in a counterbalancing fashion permitting it to be easily partially opened from a substantially concealed position of a hunter to an unobstructed forward viewing position. Another feature is that the blind may be flatly collapsed on the boat top and similarly flatly collapsed for storage when not in use.

SUMMARY OF THE INVENTION

A frame structure comprising a plurality of bow type elements pivotally connected with brackets for vertical pivoting movement about respective horizontal axes, the brackets being secured to the gunwales of an open boat. The bow elements support a camouflaged waterproof fabric covering secured by its marginal edges to the boat surface surrounding its opening with one of the bow elements forming an opening to provide unobstructed vision in a forward direction of the boat when the bow elements are partially pivoted toward a collapsed position. Stop pins, contained by the brackets, maintains the blind in fully closed or partially open position. Removal of the stop pins permits the blind to be fully collapsed horizontally. Releasable fasteners permits the bow elements and fabric covering to be disconnected as a unit from the brackets and the boat.

The principal objects of this invention are to provide an adjustable and removable lightweight open boat blind for hunting or photographing game formed by a frame supporting a camouflaged weatherproof covering which is easily installed, erected, camouflaged, collapsed or removed for concealing hunters, or the like, from wild game and which is easily and quickly operated by the hunter from a hunter's concealed surveillance position to a partially unobstructed forward field of view position without the use of the hunter's hands.

BRIEF DESCRIPTION OF THE DRAWINGS

FIG. 1 is a perspective view of the blind in hunter concealed position when mounted on a small boat;

FIG. 2 is a view similar to FIG. 1 illustrating the blind in a partially collapsed unobstructed forward shooting position;

FIG. 3 is a perspective view illustrating a major portion of the blind flatly collapsed on the boat top;

FIG. 4 is a perspective view, to an enlarged scale, of the frame structure, per se;

DESCRIPTION OF THE PREFERRED EMBODIMENT

Figure 5:
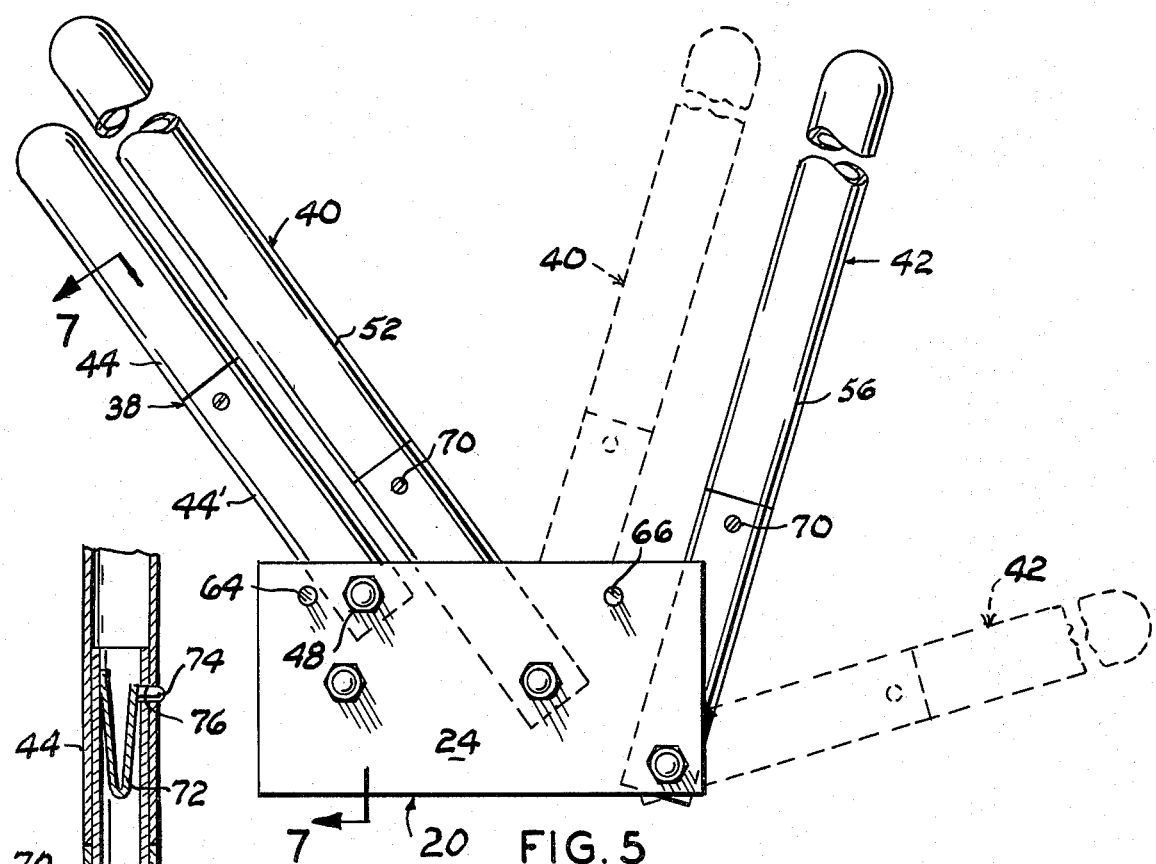
FIG. 5 is a fragmentary side elevational view, to a further enlarged scale, of the frame structure illustrating, by dotted lines, the movement of two of the bow elements to an unobstructed forward shooting position of the blind.

Like characters of reference designate like parts in those figures of the drawings in which they occur.

In the drawings:

The reference numeral 10 indicates a canopy-like hunting blind mounted on an open boat 12. The boat 12 is a pirouge but obviously other type open boats may be used. The blind 10 includes a framework 14 which supports a two-part fabric covering, hereinafter referred to as a rearward covering 16 and a forward covering 18. The frame structure 14 comprises two pairs of brackets 20 and 22, each formed by outer and inner vertically disposed edgewise parallel spaced-apart plates 24-26 and 28-30, respectively. The respective inner plates 26 and 30 are connected with right angle brackets 32 and 34, respectively, which are in turn connected with the boat gunwale 36 (FIG. 7) at the respective sides of the boat 12. The frame further includes a plurality of inverted U-shaped bow members forming a front bow 38, a door bow 40 and a rear bow 42. The depending end portion of the front bow legs 44 and 46 are disposed between the forward end portion of the bracket plates 24-26 and 28-30, respectively, and are pivotally secured by bolts 48 extending through the respective pair of plates and the adjacent leg of the angle bracket. A sleeve 50 surrounds the respective bolt 48 between the respective pair of plates to permit freedom of vertical pivoting movement of the front bow about the horizontal axis formed by the bolts 48.

The legs 52 and 54 of the bow element 40 are similarly connected at their depending end portions by other bolts and sleeves intermediate the ends of the respective pair of bracket plates. The rear bow legs 56 and 58 are similarly connected at their depending end portions between the rearward end portions of the bracket plates by other bolts and sleeves.

The bight portion of the respective bow elements 38, 40 and 42 is formed by an intermediate tubular member 60 telescopically adjustable at its respective end portions within the adjacent end portions of the respective bow forming leg members and secured in a selected position by self tapping screws 62 (FIG. 8) for adjusting the transverse dimension of the frame 14 in accordance with the spacing between the gunwales of the boat 12. The pairs of brackets 20 and 22 further include a pair of transverse stop pins 64 and 66 respectively disposed horizontally forwardly of the front bow legs 44 and 46 and rearwardly of the door bow legs 52 and 54 for the purposes presently explained.

Figure 7:
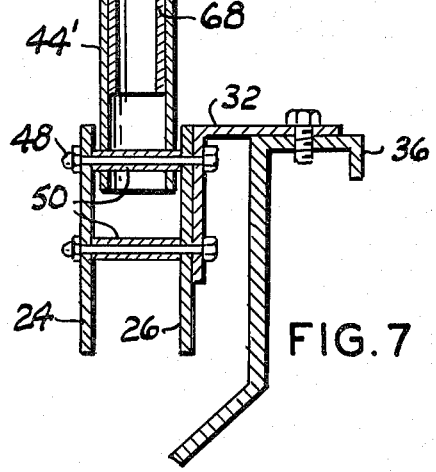
FIG. 7 is a fragmentary vertical cross sectional view taken substantially along the line 7—7 of FIG. 5; and, FIG. 8 is a fragmentary horizontal sectional view, to a different scale, taken substantially along the line 8—8 of FIG. 4.

Referring more particularly to FIG. 7, the depending end portion of each of the bow element legs is transversely divided above the position of the respective bracket plates to form a lower leg portion 44' which telescopically receives the depending end portion of a sleeve 68 secured within the leg portion 44' by a self tapping screw 70. The upper end portion of the sleeve 68 telescopes into the depending end portion of the leg 44 and is provided with a leaf spring 72 doubled back upon itself and secured by one end portion to the inner wall surface of the upper end portion of the sleeve 68. The other end portion of the spring 72 is connected with a cylindrical button 74 normally projecting outwardly through aligned apertures 76 formed through the wall of the sleeve and leg 44 so that when the button 74 is manually depressed inwardly against the tension of the spring the leg 44 may be removed from the sleeve 68.

The fabric coverings 16 and 18 are preferably formed from lightweight fabric material preferably camouflaged by painting its outer surface and sprayed with a waterproofing material, not shown. The rearward covering 16 is dimensioned to transversely span the bow members 40 and 42 in overlying relation and to extend rearwardly for connection at its lateral and rearward marginal edges 80 to the stern surface of the boat by snap fasteners 82, or the like. The forward edges of the rearward covering 16 are secured to the door bow 40 and an intermediate portion of the covering 16 is similarly secured to the rear bow member 42 when in the position illustrated by FIGS. 4 and 5 for movement with these bow members when the latter are pivoted about their horizontal axes, as presently explained. The forward fabric covering 18 similarly transversely spans and is connected at its rearward end to the front bow element 38 and is similarly connected by its other marginal edges 84 to the upper bow surface of the boat around the forward limit of its opening.

The solid line position of the bow elements, illustrated by FIG. 5, depicts the relative position of the bow elements with respect to the brackets 20 and 22 when the blind is in the position illustrated by FIG. 1. In this position the forward bow 38 is supported in a forward upwardly inclined position by its legs 44 and 46 contacting the forward stop pins 64 so that the forward fabric covering 18 is disposed above the position of the hunter's feet and legs.

Figure 6:
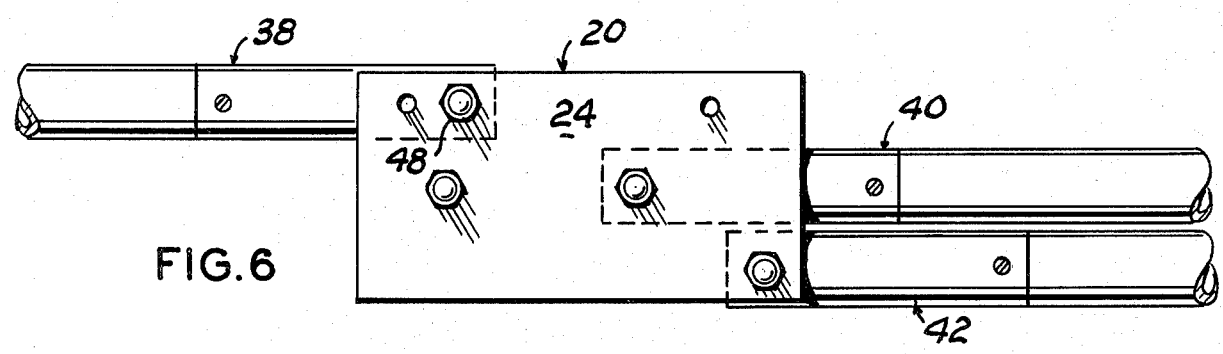
FIG. 6 is a fragmentary side elevational view, similar to FIG. 5, illustrating the position of the frame structure when the blind is fully collapsed.

In the closed position of the blind (FIGS. 1 and 5), the door bow 40 is inclined forwardly and upwardly and supported by the front bow 48 thus forming a forward viewing area through the door bow element 40 above the upper limit of the front bow element 38. In this position gravitational attraction for the door bow and major portion of the rearward covering 16 forms a forwardly disposed counterweight tending to maintain the door bow 40 inclined forwardly and the rear bow 42 inclined upwardly and rearwardly thus providing ample head room for the hunter when seated in the boat 12. The door bow 40 and rear bow 42 are moved rearwardly to their dotted line position of FIG. 5 to provide an unobstructed forward field of vision wherein the rearward stop pin 66, by contact with the door bow legs 52 and 54, stops rearward movement of the bows 40 and 42 and covering 16 in the position illustrated by FIG. 2, this movement being accomplished by the hunter lifting his weapon 86 into contact with the bight portion of the door bow to overcome its counterbalancing action so that gravitational attraction for the mass of the rearward portion of the blind pivots the bows and rearward covering rearwardly. The blind may be completely collapsed on the top of the boat by removing the stop pins 64 and 66 thus permitting the bow members to pivot downwardly to the position illustrated by FIG. 6.

The entire blind may be removed from the boat by separating the bow member legs from their bracket connected end portions by depressing the respective spring urged buttons 74 as described hereinabove and disconnecting the marginal edges of the fabric covering at the position of the snap fasteners 82.

Obviously the invention is susceptible to changes or alterations without defeating its practicability. Therefore, we do not wish to be confined to the preferred embodiment shown in the drawings and described herein.

We claim:

1. In a hunting blind in combination with a small open boat having gunwales, the improvement comprising:
    a pair of brackets respectively secured to each gunwale in transversely aligned relation,
        each bracket of said pair of brackets comprising a pair of plates vertically disposed edgewise in parallel spaced relation;
    a plurality of inverted U-shaped bow means extending between and secured to said pairs of plates for forward and rearward vertical pivoting movement about a horizontal axis between a first blind closed position and a second blind opened position,
        said bow means comprising a forward bow, a door bow and a rearward bow having depending leg end portions disposed, respectively, between the forward, intermediate and rearward portions of said pairs of plates;
    a forward stop pin extending through each pair of said pairs of plates forwardly of said forward bow for normally maintaining said forward bow in said first position;
    a rearward stop pin extending through each pair of said plates rearwardly of said door bow for normally preventing rearward movement of said door bow beyond said second position;
    a forward fabric covering having a marginal edge portion overlying a portion of the upper surface of the forward end portion of said boat and having a rearward end portion secured to said forward bow;
    a rearward fabric covering having a marginal edge portion overlying a portion of the upper surface of the rearward end portion of said boat,
        said rearward fabric covering projecting toward the forward end of said boat in overlying relation with respect to and secured to said rearward and door bows,
        whereby said forward and rearward fabric coverings normally conceal a hunter when seated in said boat and forms an upwardly and forwardly open space at least partially exposing the hunter when said door and rearward bows are pivoted to said second position; and,
    fastening means securing said fabric coverings marginal edge portions to said boat.

* * * * *